H. V. HUNT.
GOVERNOR.
APPLICATION FILED JULY 14, 1910.

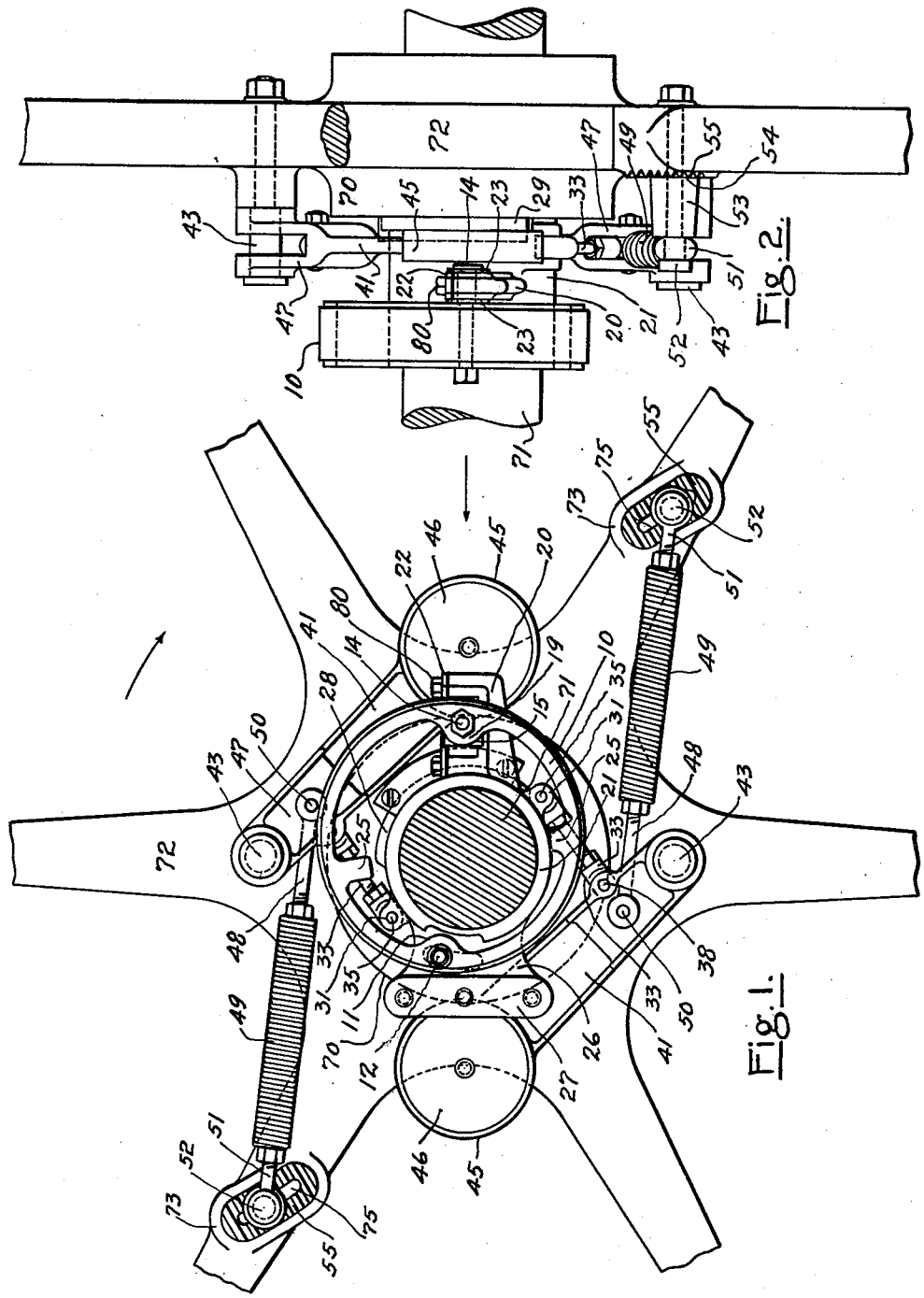

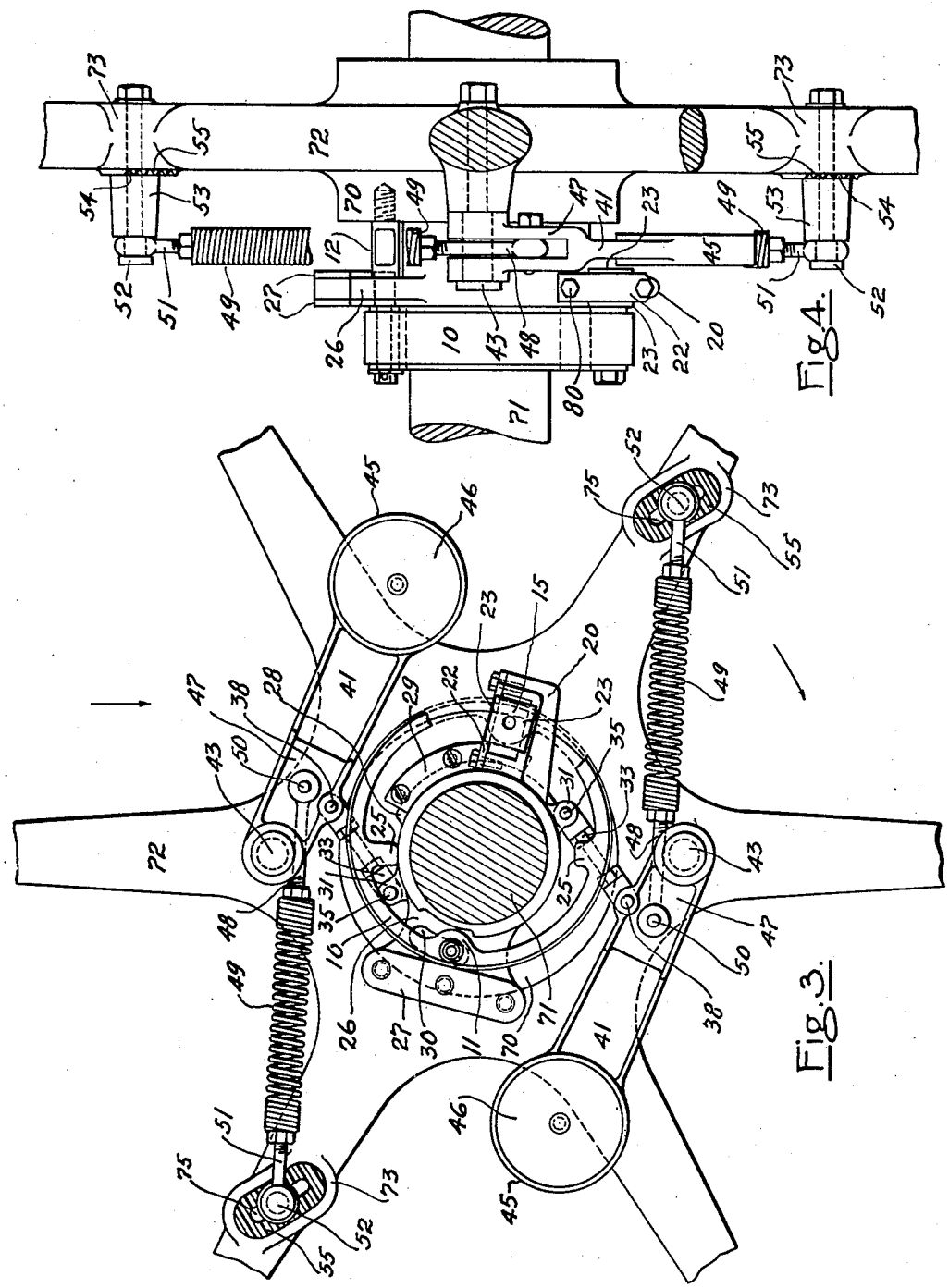

1,000,005.

Patented Aug. 8, 1911.
3 SHEETS—SHEET 3.

Witnesses:
VMBartable
E. L. Jones

Inventor
Harry V. Hunt
By his Attorney
H. C. Karlson

UNITED STATES PATENT OFFICE.

HARRY V. HUNT, OF JERSEY CITY, NEW JERSEY.

GOVERNOR.

1,000,005.   Specification of Letters Patent.   Patented Aug. 8, 1911.

Application filed July 14, 1910. Serial No. 571,944.

*To all whom it may concern:*

Be it known that I, HARRY V. HUNT, a citizen of the United States, and a resident of Jersey City, in the county of Hudson and State of New Jersey, have invented certain new and useful Improvements in Governors, of which the following is a specification.

This invention relates to shaft governors for larger sizes of slow and medium speed engines, and particularly where the governor must be placed between the supporting bearings.

One of the objects of the invention is the production of a governor having the lightest possible eccentric without any attachments and which is at the same time firmly supported to prevent wabbling, which is the occurrence when a large shiftable eccentric is directly connected to the inertia governor weights.

Another object of the invention is to provide large bearing surfaces to reduce wear on the operating parts and to so arrange these parts that they are in static as well as rotative balance.

A further object of the invention is the provision of an asynchronous adjustment of the tension springs connected with the governor weights, so that the pull exerted by the springs is constant and does not affect the inertia of the centrifugal weights, thereby giving increased sensitiveness and closer regulation, and also reducing the strain on the pin connections.

With these objects in view, the invention consists in the parts, arrangements and combinations, hereinafter described, illustrated by means of preferred embodiments in the accompanying drawings, which are hereby made a part of this specification.

Figure 5:
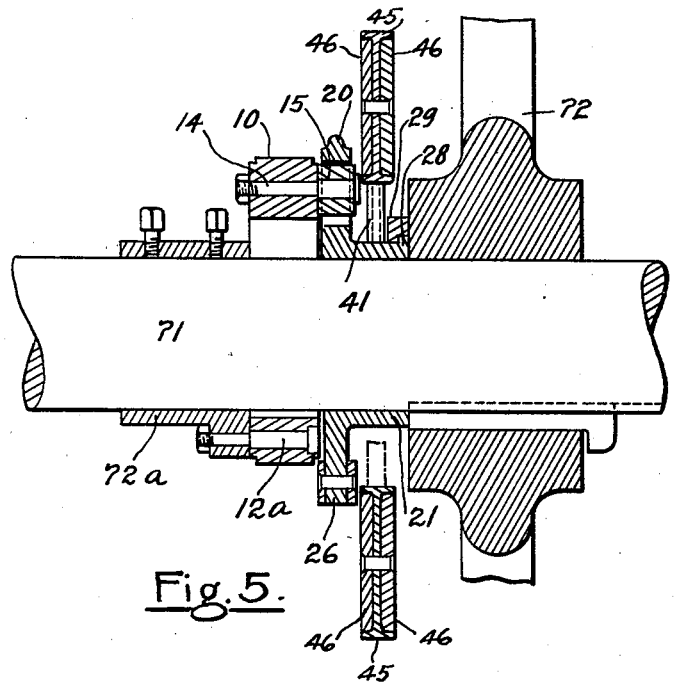
Figure 6:
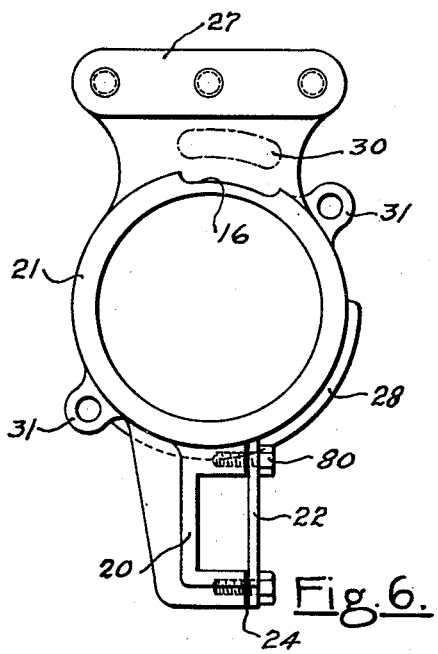
Figure 7:
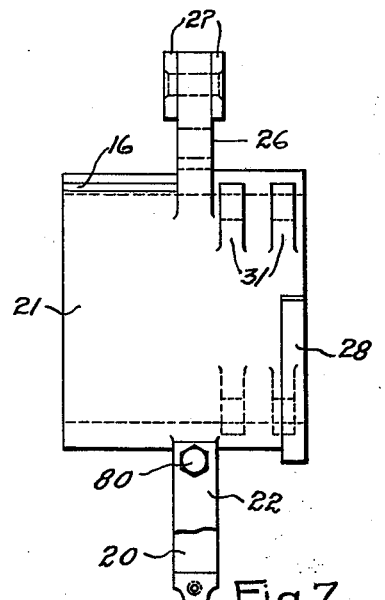

In the drawings, showing as illustrative, two preferred forms of the invention, Figure 1 is a front view of the invention, contiguous parts thereof being shown in section and other parts omitted, Fig. 2 is a side view of Fig. 1, contiguous parts being shown broken away, Fig. 3 is a view similar to Fig. 1 with the elements shown in a changed position, Fig. 4 is a top plan view of Fig. 3 looking in the direction of the arrow, Fig. 5 is a partial axial section of a modified form of the invention, Fig. 6 is an enlarged front view of one of the elements, and Fig. 7 is a side view of Fig. 6.

A light skeleton eccentric 10 encircles the engine shaft 71, on which is fixed the usual fly-wheel, or other suitable carrier, 72. The eccentric is pivoted at one side, and to this end it is shown provided with a boss 11, which is journaled at the outer end of a shoulder stud 12. The distance between the boss 11 and the shaft 71 being kept as close as possible. The inner end of the stud 12 is shown as screwed into the hub 70 of the fly-wheel, and its outer end is shown as provided with a pinned collar that retains the eccentric.

A sleeve 21 is mounted oscillatably on the shaft 71. In accordance with the preferred form of the invention, this sleeve is held against longitudinal movement on the shaft by means of an arcuate basal flange 28 contiguous the hub of the fly-wheel, and an arcuate retaining and supporting strip 29 that is secured to the hub of the fly-wheel and engages over the periphery and outer face of the said flange. This sleeve 21 has a yoke 20 projecting from one side thereof. The said yoke has a radially slotted bearing, in which works a slide block 15 that is journaled on a headed stud 14 secured in a boss 19 on the eccentric 10.

The block 15 is directly opposite the pivot stud 12 of the eccentric. In the preferred construction, the yoke 20 comprises a body portion having a slot that is open at one side, and a removable and adjustable bar 22 closing this side of the slot, the ends of the bar being secured to the body of the yoke by screws 80 and shims being interposed between the bar and the body of the yoke, as indicated at 24 in Fig. 6. Thus, wear may be compensated for by removing one or more of the shims. Preferably, the slide block 15 is provided with side flanges 23 that bear on the opposite side faces of the yoke 20 at both sides of the slotted bearing, to maintain lateral adjustment therewith.

Directly opposite the yoke 20, the sleeve 21 carries a counterbalance weight, that may be provided by pieces 27 secured at opposite sides to a tail piece 26 on the sleeve. Due to the close proximity of the counterweight to the said sleeve 21 the center of gravity of the former is approximately equal to that of the eccentric 10 to equalize the centrifugal force when the latter enumerated elements are rotated around the axis of the engine shaft. By means of this counterbalance weight, the eccentric and the sleeve are maintained in both static and rotative balance.

The tail piece 26 may be provided with a slot 30, as shown in Fig. 6, through which the stud 12 may pass. Also the sleeve may be cut away or notched, as shown at 16 in the said view, to accommodate the boss 11.

Symmetrically arranged weight arms 41 are pivoted to the fly-wheel 72 on studs 43. They carry inertia or centrifugal weights 45 at their outer ends, which weights may be constituted by pieces 46 secured in recesses in the sides of the arms. The arms 41 are connected with the sleeve 21 by means of adjustable links 33, which are shown pivoted at 38 to the arms 41 and at 35 to diametrically opposite pairs of ears 31 on the sleeve (see Fig. 7). The ears 31 are located at definite distances between the counterbalance weight 27 and the yoke 20. Tension springs 49 are connected at one end to the arms 41, as by means of stub ends 48 pivoted at 50 in forked portions 47 of the arms, and at the other end to the fly-wheel, as by stub ends 51 pivoted on studs 52. Provision may be made for varying the tension and angular position of the springs. To this end, I have shown the studs 52 as secured in slots 75 in bosses 73 on the arms of the fly-wheel. The studs 52 may pass through blocks 53, having serrations or teeth 54 that engage similar teeth 55 on the bosses 73.

The center lines of the springs 49 and of the arms 41 form decidedly acute angles. Thus, the practically straight radial travel of the pivot pins 50 causes the springs to impose a constant or fixed load on the centrifugal or inertia weights 45, by virtue of which an asynchronous adjustment of the springs is effected, and the strain on the pivot pins 43 of the weight arms 41 is neutralized. The arrangement is such that, when the parts have been shifted to the maximum degree, as shown in Fig. 3, the stub ends 48 practically touch the pins 43. In other words, the angle between the center lines of the springs 49 and of the arms 41 is reduced to the minimum, so that distortion of the springs is likewise reduced to the minimum, whereby their tension remains constant.

The movement of the eccentric 10 is limited in opposite directions by means of inward projecting stops 25 thereon, which contact alternately with the sleeve 21. One stop contacts at the position of rest, as shown in Fig. 1, and the other stop contacts when the eccentric has been shifted to the limit, as shown in Fig. 3.

In Fig. 5 is shown a modified structure, in which the pin 12ᵃ supporting the eccentric is secured to a collar 72ᵃ fixed on the shaft by means of set screws.

The operation of the invention has been largely described with the description of structure.

As will be understood, the eccentric 10 is connected by a suitable rod with the valve mechanism. Increasing speed of the shaft and fly-wheel causes the weights 45 to move outward, thus turning the sleeve 21 about the shaft. This movement of the sleeve swings the eccentric by means of the yoke and sliding block connection, during which operation the block slides in the yoke, due to the difference in the centers about which the sleeve and the eccentric turn. This movement of the eccentric operates to produce a shorter cut off, with consequent reduction of speed, during which reduction the parts move back in the reverse direction.

Having thus described my invention, what I claim as new, and desire to secure by Letters Patent, is:

1. In a governor, the combination with the shaft, of a pivoted eccentric ring encircling the shaft, a sleeve oscillatably mounted on the shaft, governor weights and connections between said weights and said sleeve, a yoke carried by said sleeve and presenting a radially slotted bearing, and a slide block pivoted on said eccentric and slidable in said slotted bearing.

2. In a governor, the combination with the shaft, of a pivoted eccentric ring encircling the shaft, a sleeve oscillatably mounted on the shaft, governor weights and connections between said weights and said sleeve, a yoke carried by said sleeve and presenting a radially slotted bearing, and a slide block pivoted on said eccentric and slidable in said slotted bearing, said slide block having side bearing flanges working on the side faces of said yoke at opposite margins of the slotted bearing adapted to maintain the block and therewith connected elements in lateral alinement.

3. In a governor, the combination with the shaft and a carrier fixed thereon, of an eccentric ring encircling the shaft and pivoted at one side to said carrier, a slide block pivotally mounted on said eccentric at the side opposite the pivot of the eccentric, a sleeve oscillatably mounted on the shaft, and a yoke extending from one side of the sleeve and presenting a radially slotted bearing in which said block is received.

4. In a governor, the combination with the shaft and a carrier fixed thereon, of an eccentric ring encircling the shaft and pivoted at one side to said carrier, a slide block pivotally mounted on said eccentric at the side opposite the pivot of the eccentric, a sleeve oscillatably mounted on the shaft, a yoke extending from one side of the sleeve and presenting a radially slotted bearing in which said block is received, and a counterbalance weight carried by said sleeve at the side opposite said yoke.

5. In a governor, the combination with the shaft, of a pivoted eccentric ring encircling the shaft, a sleeve oscillatably mounted on the shaft, governor weights and connections between said weights and said sleeve, a yoke carried by said sleeve and presenting a radially slotted bearing, and a slide block pivoted on said eccentric and slidable in said slotted bearing, one side of said yoke being removably and adjustably attached thereto.

6. In a governor, the combination with the shaft, of a pivoted eccentric ring encircling the shaft, a sleeve oscillatably mounted on the shaft, governor weights and connections between said weights and said sleeve, a yoke carried by said sleeve and presenting a radially slotted bearing, and a slide block pivoted on said eccentric and slidable in said slotted bearing, said yoke comprising a body portion with a slotted recess open along one side, a bar closing said open side, screws securing the ends of said bar to the body, and adjustment means interposed between the ends of the bar and the body.

7. In a governor, the combination with the shaft, of a pivoted eccentric ring encircling the shaft, a sleeve oscillatably mounted on the shaft and having a peripheral flange, an arcuate retaining and supporting member engaging said flange and holding the sleeve against longitudinal movement on the shaft, governor weights and connections between said weights and the sleeve, and a slidable connection between the sleeve and the eccentric.

8. In a governor, the combination with the shaft and a fly-wheel thereon, of a pivoted eccentric ring encircling the shaft, a sleeve oscillatably mounted on the shaft and having a basal flange contiguous the hub of said fly-wheel, an arcuate retaining and supporting strip secured to the hub of said fly-wheel and engaging over the periphery and the outer face of the said flange, governor weights and connections between said weights and the sleeve, and a slidable connection between the sleeve and the eccentric.

9. In a governor, the combination with the shaft and a collar fixed thereon, of an eccentric ring encircling the shaft, a stud projecting from said collar and pivotally supporting said eccentric at one side, a sleeve oscillatably mounted on the shaft, governor weights and connections between said weights and said sleeve, a yoke carried by said sleeve and presenting a radially slotted bearing, and a slide block pivoted on said eccentric and slidable in said slotted bearing.

10. In a governor, the combination with the shaft, of a pivoted eccentric ring encircling the shaft, internal stop projections carried by said eccentric ring and limiting the movement thereof in both directions, a sleeve oscillatably mounted on the shaft, governor weights and connections between said weights and said sleeve, a yoke carried by said sleeve and presenting a radially slotted bearing, and a slide block pivoted on said eccentric and slidable in said slotted bearing.

Signed at the borough of Manhattan in the county of New York and State of New York this 13th day of June A. D. 1910.

HARRY V. HUNT.

Witnesses:
H. C. KARLSON,
E. L. JONES.

---

Copies of this patent may be obtained for five cents each, by addressing the "Commissioner of Patents, Washington, D. C."